I. P. Tice.
Spirit-Meter.
Nº 72701. Patented Dec. 24, 1867.
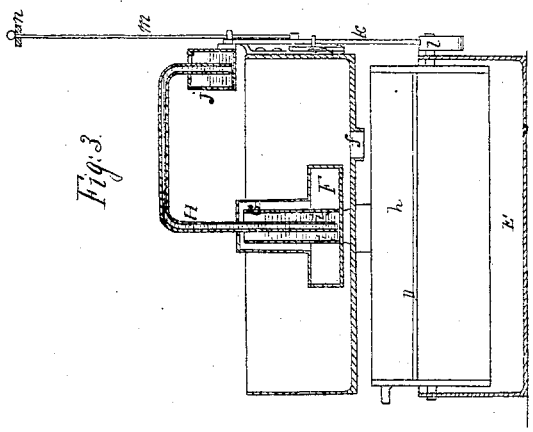
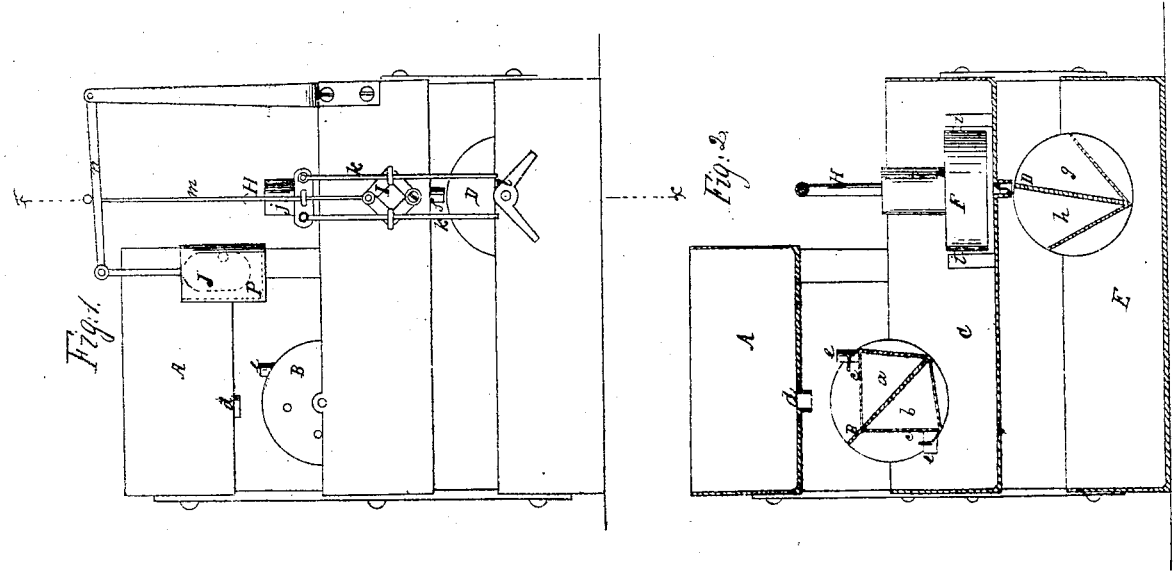
Witnesses
Inventor:
Isaac P. Tice

United States Patent Office.

ISAAC P. TICE, OF NEW YORK, N. Y.

Letters Patent No. 72,701, dated December 24, 1867.

---

IMPROVEMENT IN SPIRIT-METERS.

---

The Schedule referred to in these Letters Patent and making part of the same.

---

TO ALL WHOM IT MAY CONCERN:

Be it known that I, ISAAC P. TICE, of the city, county, and State of New York, have invented a new and useful Improvement in Spirit-Meters, of which the following is a full, clear, and exact description, reference being had to the accompanying drawing, forming part of this specification, and in which—

Figure 1 represents an outside elevation of a meter, or meter in part, embracing my invention.

Figure 2 is a longitudinal sectional elevation of the same; and

Figure 3, a transverse section thereof, through the line $x\ x$ in fig. 1.

Similar letters of reference indicate corresponding parts.

This my improvement in spirit-meters consists in combining with the meter means which are automatically operative, by the temperature of the spirit in its passage through the meter, to regulate the quantity weighed or measured, in a given time, in accordance with the temperature of the spirit, as affecting its volume; and further consists in means, operated by the specific gravity of the fluid, for action in concert with the thermo-compensating devices just referred to, for further regulation of the quantity of spirit passed through the meter in a given time, and by which two means or devices, taken in connection with measuring and weighing-cans, the registers made by the latter are determined or regulated to give an exact record of quantity and proof of the spirit when cold, however warm or variable may have been its temperature in its passage through the meter.

Referring to the accompanying drawing, A represents a receiver for the products of the still, and beneath which is arranged an oscillating or alternately opposite-tilting measuring-can, B, made up of chambers $a\ b$, which, as they are filled and furnished with an overflow on their tops or outer trays, $c$, from a nozzle, $d$, alternately tilt in opposite directions, and discharge their contents, by outlets $e$, into a trough or chamber, C, and record, by a suitable register connected with the can, the volume of spirit measured, as denoted by the number of tilts made by the can in a given time, as in the case of other measuring-arrangements. The spirit thus measured passes from the trough C, through an outlet, $f$, to a weighing-can, D, also made of chambers, $g\ h$, which alternately, as the can is tilted, or oscillated in opposite directions by the weight of the fluid, discharge into a common receiver, E, and record, on a suitable register, the weight of spirits passed, as denoted by the tilting-operations of the can, as in the case of other weighing-cans, but with this difference: supposing the fluid passing through the meter to be of a fixed temperature, then the discharge or quantity delivered by the can D, each tilt, will be uniform, but as variation in the temperature affects its volume, and alteration in specific gravity its weight for a given bulk, the record shown in the registering-devices operated by the measuring and weighing-cans will be uncertain, incorrect, or incomplete, from which to make calculations as to the quantity of spirit passed at a fixed temperature and average proof of the same, unless separate registers be kept of temperatures and specific gravities each operation of the cans, or at least at frequent intervals. Thus, if the spirit passing into the measuring-can be very warm, then the volume will be greater than when the spirit is cold, and a can-discharge of the hot fluid will, though registered as a canful, be less than that quantity when cooled down; and a like inaccuracy attends the action of the weighing-can, which will tilt with a less quantity of a large specific gravity than where the specific gravity is lighter; and as it requires a certain weight of spirit to tilt the can, it is not only the specific gravity alone that has to be considered, but also the volume as affected by temperature, and which influences the weight.

To do away, therefore, with separate specific gravity and temperature-registering devices or records, and to make the two operations of weighing and measuring furnish correct data, by which, however varying the specific gravity and temperature of the spirit passing, the record made by the measuring and weighing-cans will be correct and complete, as regards indicating the bulk of spirit passed at a uniform temperature and average specific gravity, I cause the tilting-action of the weighing-can to be automatically controlled, both by the changes in temperature of the spirit (affecting its volume) and alterations in its specific gravity, so as to establish a uniformity of record, in accordance with such changes.

The means for doing this may be substantially as follows: Arranged, say in the chamber C, and immersed in the spirit, is a close-air vessel, F, hung on trunnions $i$. This vessel carries within it a smaller cylinder or vessel, G, open at its top, and having, dipping down within it, to a point near its bottom, a bent pipe or tube, H, open at its bottom, but bending or stretching outside of the vessels F and G, at right angles to the trunnions $i$, closed at its outer end, and terminating in a bulb or can, $j$, having a suitable cavity for the expulsion of air. Any suitable liquid is poured into the vessel G, and, at a certain or ordinary temperature, the whole contrivance is so balanced as that the can $j$ contains a certain and fixed weight in it, but upon the temperature of the spirit in the chamber C being raised, then the air in the vessel F is expanded, and caused to press upon the surface of the liquid in the cylinder G, and expel it more or less up the tube H, and along the horizontal arm of the latter, more or less, into the can $j$, according to the pressure of the air acting upon the liquid in G, and which, of course, will be governed by the temperature of the spirit in C. This action forcing more or less liquid into the can $j$, gives more or less resistance or weight to the can, and is made to control the action of the weighing-can D, by means of rods $k\ k$, connected with the can $j$, and projecting downwards, one on either side of the axis of the weighing-can, and so that, in the tilting of the weighing-can, a double toe, $l$, attached to the can-shaft, is made to raise or bear under either one of the rods $k\ k$, with the resistance due to the weight in $j$, which accordingly, by adding to or taking off weight from the weighing-can, controls the tilting of the same, in accordance with the change of temperature, as affecting the weight for a given volume, whereby a correct record is obtained irrespective of temperature.

To (as previously explained to be necessary) provide for a specific-gravity compensating-action of the weighing-can as well, I cause the rods $k\ k$ to pass through eyes of a toggle-joint, I, which is operated by a rod, $m$, connected with or acted upon by a lever, $n$, operated by a float, J, in a cylinder or vessel, $p$, communicating with, say, the receiver A. The float J is raised by an increase in specific gravity of the spirit, and, lifting the rod $m$ more or less, closes the toggle-joint I, and draws inwards the lower ends of the rods $k\ k$, so that, by their closer approach to the axis of the weighing-can, the toe $l$ has the weight in the can $j$ increased or diminished, so far as concerns its action on the weighing-can, by the difference in leverage so induced of the weight in the can $j$ on the toe $l$. Upon the spirit diminishing in specific gravity, the float J sinks and the toggle-joint I opens, causing a reverse action as regards leverage of the weight in the can $j$, on the toe $l$.

Thus the weighing-can discharge is not only regulated automatically by the temperature, but also by the specific gravity of the spirit, whereby the registers of the measuring and weighing-cans furnish correct data for ascertaining the quantity of spirit passed through the meter, at a given or average proof, irrespective of the variations in temperature and specific gravity.

What I here claim, and desire to secure by Letters Patent, is—

1. The combination, with a spirit-meter, or weighing and measuring-cans thereof, of a thermo-compensating device or attachment, operating automatically to control the quantity of the spirit weighed, or weighed and measured, in its passage through the meter, substantially as specified.

2. Regulating, in an automatic manner, the action or discharge from the weighing-can of a spirit-meter, by the varying specific gravity of the fluid, essentially as herein set forth.

3. The combination, in a spirit-meter, of devices automatically operating, by the varying densities and temperature of the fluid passing through the meter, to regulate the action of the weighing-can, substantially as specified.

4. The combination of the toe $l$ on the weighing-can shaft, and rods $k\ k$, with a device operated by the temperature of the spirit, for adjustment of weight on said rods, to regulate the action of the weighing-can, substantially as specified.

5. The toggle-joint I, rods $k\ k$, and toe $l$, in combination with a float, operated by the specific gravity of the spirit, essentially as and for the purpose herein set forth.

ISAAC P. TICE.

Witnesses:
A. LE CLERC,
J. W. COOMBS.